(12) United States Patent
Kaushal et al.

(10) Patent No.: US 10,791,375 B2
(45) Date of Patent: *Sep. 29, 2020

(54) METHOD AND SYSTEM TO PROVIDE VIDEO-BASED SEARCH RESULTS

(71) Applicant: EBAY INC., San Jose, CA (US)

(72) Inventors: Govind Kaushal, San Francisco, CA (US); Jai Dandekar, Garden Ridge, TX (US); Naren Chittar, San Jose, CA (US); Bhanu Koppaka, San Jose, CA (US); John Sheeley, San Francisco, CA (US); Matthew Bret MacLaurin, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/694,909

(22) Filed: Apr. 23, 2015

(65) Prior Publication Data

US 2015/0229998 A1  Aug. 13, 2015

Related U.S. Application Data

(63) Continuation of application No. 13/725,638, filed on Dec. 21, 2012, now Pat. No. 9,031,927.

(Continued)

(51) Int. Cl.
*G06F 16/00* (2019.01)
*H04N 21/482* (2011.01)
(Continued)

(52) U.S. Cl.
CPC ......... *H04N 21/482* (2013.01); *G06F 16/345* (2019.01); *G06F 16/43* (2019.01); *G06F 16/951* (2019.01); *H04N 21/472* (2013.01)

(58) Field of Classification Search
CPC ..... G06Q 30/02; G06F 17/3089; G06F 16/43; G06F 16/345; G06F 16/951; H04N 21/482; H04N 21/472

See application file for complete search history.

(56) References Cited

U.S. PATENT DOCUMENTS 6,058,417 A    5/2000 Hess et al.
6,229,850 B1 * 5/2001 Linzer ............... H04N 19/51
                                                       375/240.1

(Continued)

FOREIGN PATENT DOCUMENTS

CA    2681669 A1    11/2008
CA    2693803 A1    1/2009

(Continued)

OTHER PUBLICATIONS

"U.S. Appl. No. 13/725,638, Final Office Action dated Aug. 13, 2014", 12 pgs.

(Continued)

*Primary Examiner* — Tarek Chbouki
(74) *Attorney, Agent, or Firm* — Shook, Hardy & Bacon LLP (57) ABSTRACT

Method and system to provide video-based search results are described. A search results video may be present to a user details from listings that match certain search criteria. When a select request associated with the search results video is detected, a listing rendering module presents the selected listing on the display device.

18 Claims, 5 Drawing Sheets

Related U.S. Application Data (60) Provisional application No. 61/623,822, filed on Apr. 13, 2012.

(51) Int. Cl.
  *G06F 16/43* (2019.01)
  *G06F 16/34* (2019.01)
  *G06F 16/951* (2019.01)
  *H04N 21/472* (2011.01)

(56) References Cited

U.S. PATENT DOCUMENTS

| | | | |
|---|---|---|---|
| 8,291,452 B1 | 10/2012 | Yong et al. | |
| 8,458,053 B1* | 6/2013 | Buron | G06Q 30/06 |
| | | | 705/14.4 |
| 8,843,959 B2 | 9/2014 | Mcmaster et al. | |
| 9,031,927 B2 | 5/2015 | Kaushal et al. | |
| 9,147,194 B1* | 9/2015 | Le | G06Q 30/02 |
| 9,201,672 B1* | 12/2015 | Arana | G06F 17/3089 |
| 2001/0044751 A1* | 11/2001 | Pugliese, III | G06Q 30/02 |
| | | | 705/14.1 |
| 2002/0038456 A1* | 3/2002 | Hansen | H04N 7/17318 |
| | | | 725/46 |
| 2002/0161635 A1* | 10/2002 | Berg | G06Q 30/02 |
| | | | 705/14.39 |
| 2006/0106764 A1 | 5/2006 | Girgensohn et al. | |
| 2006/0152504 A1 | 7/2006 | Levy | |
| 2007/0118873 A1 | 5/2007 | Houh et al. | |
| 2007/0130159 A1 | 6/2007 | Gulli et al. | |
| 2008/0036917 A1* | 2/2008 | Pascarella | G11B 27/11 |
| | | | 348/702 |
| 2008/0140523 A1 | 6/2008 | Mahoney et al. | |
| 2008/0140644 A1* | 6/2008 | Franks | G06F 17/30817 |
| 2008/0143481 A1* | 6/2008 | Abraham | G06Q 30/02 |
| | | | 340/10.1 |
| 2008/0154889 A1 | 6/2008 | Pfeiffer | |
| 2008/0244408 A1* | 10/2008 | King | G06F 17/30864 |
| 2008/0271098 A1* | 10/2008 | Kalaboukis | H04N 7/17318 |
| | | | 725/109 |
| 2008/0295130 A1 | 11/2008 | Worthen | |
| 2008/0301117 A1 | 12/2008 | Zeng et al. | |
| 2009/0024617 A1 | 1/2009 | Cope | |
| 2009/0222767 A1 | 9/2009 | Matthews et al. | |
| 2010/0082585 A1 | 4/2010 | Barsook et al. | |
| 2010/0083170 A1 | 4/2010 | Lim et al. | |
| 2010/0106764 A1 | 4/2010 | Chadwick et al. | |
| 2010/0153885 A1* | 6/2010 | Yates | G06F 3/0482 |
| | | | 715/841 |
| 2010/0186038 A1 | 7/2010 | Thomas et al. | |
| 2010/0268720 A1 | 10/2010 | Spivack et al. | |
| 2010/0313252 A1 | 12/2010 | Trouw | |
| 2011/0044549 A1* | 2/2011 | Bressan | G11B 27/034 |
| | | | 382/225 |
| 2011/0099195 A1 | 4/2011 | Patwardhan et al. | |
| 2011/0115799 A1 | 5/2011 | Imbruce | |
| 2011/0137753 A1* | 6/2011 | Moehrle | G06Q 30/02 |
| | | | 705/27.1 |
| 2011/0231260 A1* | 9/2011 | Price | G06Q 30/02 |
| | | | 705/14.61 |
| 2012/0011085 A1 | 1/2012 | Kocks et al. | |
| 2012/0011109 A1 | 1/2012 | Ambwani et al. | |
| 2012/0066010 A1 | 3/2012 | Williams et al. | |
| 2013/0024895 A1 | 1/2013 | Yong et al. | |
| 2013/0033645 A1 | 2/2013 | Jellicoe | |
| 2013/0166587 A1 | 6/2013 | Berry et al. | |
| 2013/0195422 A1 | 8/2013 | Patil et al. | |
| 2013/0216207 A1 | 8/2013 | Berry et al. | |
| 2013/0275412 A1 | 10/2013 | Kaushal et al. | |
| 2014/0177964 A1* | 6/2014 | Godlewski | H04N 21/23109 |
| | | | 382/190 |

FOREIGN PATENT DOCUMENTS

| | | | |
|---|---|---|---|
| CA | 2748600 | A1 | 7/2010 |
| CN | 101566990 | A | 10/2009 |
| CN | 104246755 | A | 12/2014 |
| JP | 2005-208751 | A | 8/2005 |
| KR | 10-2016-72308 | B1 | 11/2016 |
| WO | WO-2011049799 | A1 | 4/2011 |
| WO | WO-2013154613 | A1 | 10/2013 |

OTHER PUBLICATIONS

"U.S. Appl. No. 13/725,638, Final Office Action dated Sep. 25, 2013", 13 pgs.

"U.S. Appl. No. 13/725,638, Non Final Office Action dated Mar. 27, 2014", 12 pgs.

"U.S. Appl. No. 13/725,638, Non Final Office Action dated Mar. 28, 2013", 11 pgs.

"U.S. Appl. No. 13/725,638, Notice of Allowance dated Jan. 9, 2015", 12 pgs.

"U.S. Appl. No. 13/725,638, Response filed Jun. 27, 2014 to Non Final Office Action dated Mar. 27, 2014", 11 pgs.

"U.S. Appl. No. 13/725,638, Response filed Jun. 28, 2013 to Non Final Office Action dated Mar. 28, 2013", 13 pgs.

"U.S. Appl. No. 13/725,638, Response filed Nov. 12, 2014 to Final Office Action dated Aug. 13, 2014", 12 pgs.

"U.S. Appl. No. 13/725,638, Response filed Dec. 23, 2013 to Final Office Action dated Sep. 25, 2013", 15 pgs.

"Australian Application Serial No. 2012376544, Office Action dated Apr. 10, 2015", 3 pgs.

"European Application Serial No. 12874222.8, Response dated May 5, 2015", 10 pgs.

"International Application Serial No. PCT/US2012/072210, International Preliminary Report on Patentability dated Oct. 23, 2014", 12 pgs.

"Canadian Application Serial No. 2,861,617, Office Action dated Jun. 2, 2016", 3 pgs.

"European Application Serial No. 12874222.8, Response filed May 23, 2016 to Extended European Search Report dated Nov. 9, 2015", 16 pgs.

"Canadian Application Serial No. 2,861,617, Response filed Oct. 26, 2016 to Office Action dated Oct. 26, 2015", 18 pgs.

"Canada Application Serial No. 2,861,617, Office Action dated Oct. 26, 2015", 8 pgs.

"European Application Serial No. 12874222.8, Extended European Search Report dated Nov. 9, 2015", 8 pgs.

"Korean Application Serial No. 2014-7031813, Office Action dated Dec. 11, 2015", W/ English Translation, 7 pgs.

Halvorsen, Pal, et al., "vESP: A Video-Enabled Enterprise Search Platform", Network and System Security (NSS), 2010 4th International Conference on, IEEE, Piscataway, NJ, USA (Sep. 1, 2010), 534-541.

"Australian Application Serial No. 2016200352, First Examiner Report dated Dec. 22, 2016", 3 pgs.

"Australian Application Serial No. 2016200352, Response to First Examiner Report dated Apr. 19, 2017", 17 pgs.

"Australian Application Serial No. 2016200352, Subsequent Examiners Report dated May 16, 2017", 3 pgs.

"Canadian Application Serial No. 2,861,617, Response filed Nov. 30, 2016 to Office Action dated Jun. 2, 2016", 10 pgs.

"Chinese Application Serial No. 201280072302.9, Office Action dated Dec. 2, 2016", with English Translation, 19 pgs.

"Chinese Application Serial No. 201280072302.9, Office Action Response dated Apr. 10, 2017", W,/ English Claims, 12 pgs.

"Korean Application Serial No. 2016-7030164, Office Action dated Mar. 14, 2017", w/ English Translation, 7 pgs.

"Korean Application Serial No. 2016-7030164, Office Action Response dated Jun. 13, 2017", W / English Claims, 13.

Notice of Allowance received for Korean Patent Application No. 10-2014-7031813, dated Jul. 28, 2016, 3 pages (1 page of English Translation and 2 pages of Official Copy).

(56) References Cited

OTHER PUBLICATIONS

Notice of Allowance received for Korean Patent Application No. 10-2016-7030164, dated Oct. 31, 2017, 4 pages (1 page of English Translation and 3 pages of Official Copy).
Office Action received for Canadian Patent Application No. 2,861,617, dated Feb. 9, 2018, 4 pages.
Response to Office Action filed May 9, 2018 for Canadian Patent Application No. 2,861,617, ddated Feb. 9, 2018, 7 pages.
International Search Report received for PCT Patent Application No. PCT/US2012/072210, dated Mar. 8, 2013, 2 pages.
International Written Opinion received for PCT Patent Application No. PCT/US2012/072210 dated Mar. 8, 2013 10 pages.
Response to Office Action filed Sep. 25, 2015 for Australian Patent Application No. 2012376544 dated Apr. 10, 2015, 19 pages.
Response to Office Action filed Mar. 11, 2016 for Korean Patent Application No. 10-2014-7031813 dated Dec. 11, 2015, 21 pages (17 pages of Official Copy and 4 pages of English Claims).
Office Action received for Canada Patent Application No. 3,004,340, dated Mar. 19, 2019, 5 pages.
Office Action Received for Canadian Patent Application No. 3,004,340, dated Jan. 29, 2020, 5 pages.
Response to Office Action filed Aug. 21, 2019 for Canadian Patent Application No. 3,004,340, dated Mar. 19, 2019, 6 pages.
Response to Office Action filed on May 29, 2020, for Canadian Application No. 3,004,340, dated Jan. 29, 2020, 16 pages.

\* cited by examiner

METHOD AND SYSTEM TO PROVIDE VIDEO-BASED SEARCH RESULTS

CROSS-REFERENCE TO RELATED APPLICATIONS

This application is a continuation of U.S. patent application Ser. No. 13/725,638, filed Dec. 21, 2012, which claims the benefit of U.S. Provisional Application No. 61/623,822, filed Apr. 13, 2012, the benefit of priority of each of which is claimed hereby, and each are incorporated herein by reference in their entirety.

TECHNICAL HELD

This application relates to the technical fields of software and/or hardware technology and, in one example embodiment, to system and method to provide video-based search results.

BACKGROUND

An on-line trading platform allows users to shop for almost anything using a web browser application. A user may find an item listed by an on-line trading application by entering keywords into the search box provided on an associated web page or by browsing through the list of categories on the home page. The results of a search are presented to the user on a search results page.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and to provide video-based search results in the context of on-line trading is described. In the following description, for purposes of explanation, numerous specific details are set forth in order to provide a thorough understanding of an embodiment of the present invention. It will be evident, however, to one skilled in the art that the present invention may be practiced without these specific details.

Embodiments of the present invention include approaches that enhance user's experience by rendering search results in an engaging video. In one example embodiment, when someone types in a query, the backend system, that may be referred to as a video-based search results module, calls a search system that may be provided by an on-line trading platform to get the relevant results and then creates a dynamic video at the runtime. The video presents search results as it renders relevant information from the resulting item listings (e.g., picture, price and title of the item). The video may be presented as an overlay, it may be embedded in a webpage that shows other search-related information, etc. The video may also include custom animations and/or music. When the user clicks on the video, the user is redirected to the appropriate View Item page based on the item being displayed in the video when the user clicked on it.

In one embodiment, the video-based search results module may be configured to cache or pre-prepare video files that present search results associated with certain searches that have been determined to be requested by uses fairly often. These cached video files may be update periodically, as new item listings may be added into the item listings repository (e.g., a database). A video-based search results presentation may also be created on the fly, in response to the search requested by a user and the search results retrieved by the search system.

In one embodiment, the video-based search results module creates a mapping between item listings presented in a video and the time frame in the video during which the item listing is being presented. When the video-based search results module detects a click on the video (or some other predetermined triggering event, such as activation to a trigger video control, e.g., a "show this item details" button), the video-based search results module determines the time within the video, at which the triggering event was detected, accesses the mapping information to ascertain a listing identification (id) mapped to that time stamp or to the time frame that includes that time stamp, and retrieves the item listing that matches that item listing id. The item listing is then presented to the user.

Example method and system to provide video-based search results may be implemented in the context of a network environment 100 illustrated in FIG. 3 below, specifically as the video-based search results module 121.

Figure 1:
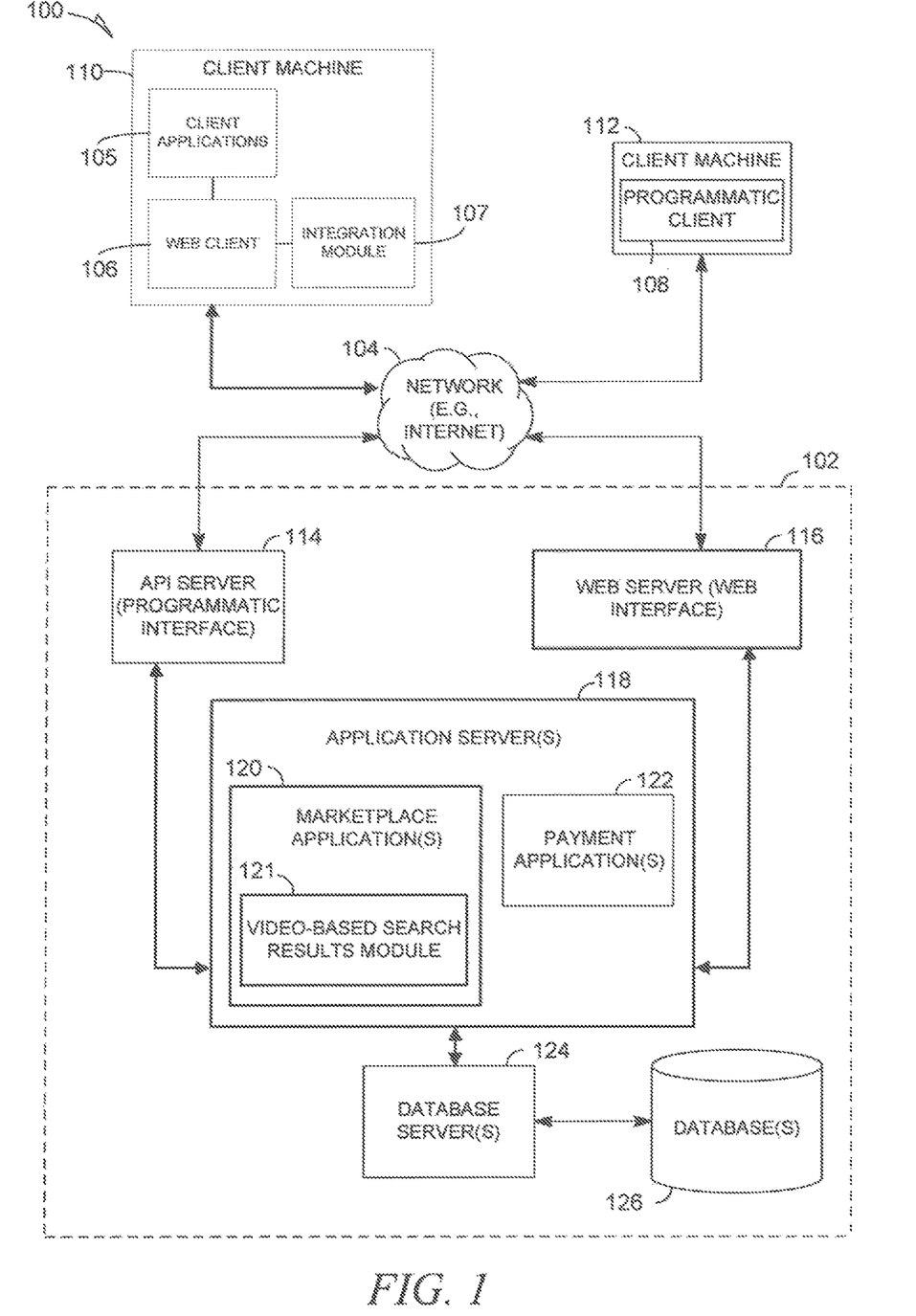
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, client applications 105 (e.g., mobile applications), an integration module 107, and a web client 106 (e.g., a mobile or desktop Web browser) operating on the client machine 110 (e.g., a mobile device), as well as a programmatic client 108 operating on the client machine 112.

An application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. Shown in FIG. 1 is a video-based search results module 121 included as one of the marketplace applications 120. The video-based search results module 121 may be utilized beneficially to present search results as an engaging video.

The payment applications 122 may provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs client-server architecture, the subject matter of the application is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

The integration module 107 on the client machine e.g., a mobile phone) may submit requests to the marketplace applications 110, through the API server 114, for an up-to-date (e.g., current) publication related to goods and/or services being offered for sale via the networked system 102. A publication related to goods and/or services being offered for sale may also be termed an item listing. Alternatively or additionally the client machine 110 may request one or more current publications from the client machine 112, via the network 104. In various example embodiments, the client machine 112 may provide a current publication to the client machine 110, after generating the current publication or retrieving such a publication from the networked system 102.

In some example embodiments, the integration module is embedded within one or more of the client applications 105 and may collect user parameters, receive targeted current publications based on the user parameters, and cause the display of one or more targeted current publications. A targeted current publication may be displayed among graphics associated with the application in which the integration module is embedded.

The applications 120, including the video-based search results module 121, may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or service.

Figure 2:
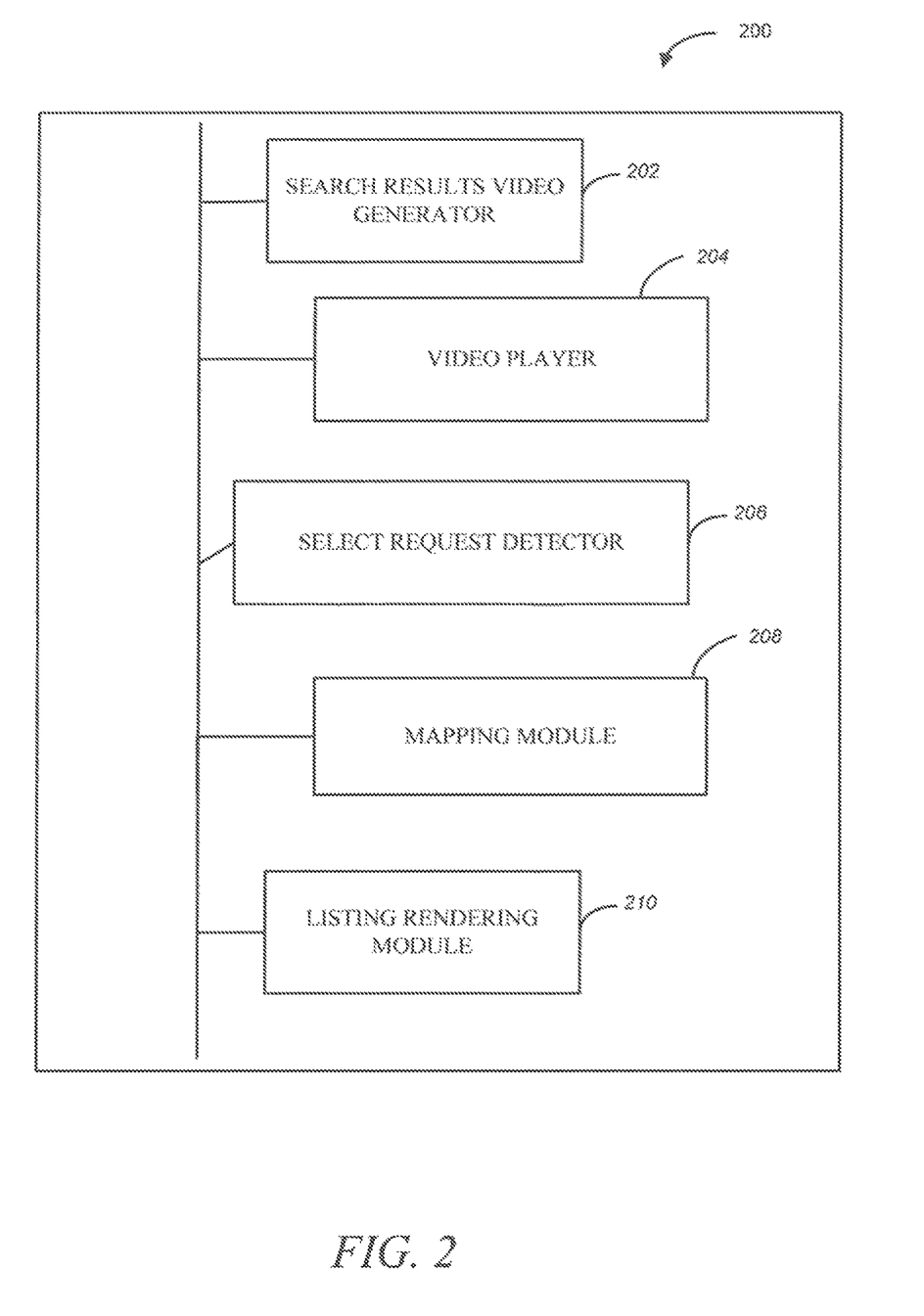
FIG. 2 is a block diagram of a system to provide video-based scare results, in accordance with one example embodiment.

FIG. 2 is a block diagram of a system 200 to provide video-based search results, in accordance with one example embodiment. As shown in FIG. 2, the system 200 includes a video player 204, a select request detector 206, a select request detector 206, a mapping module 208, and a listing rendering module 210. The video player 204 may be configured to present, on a display device search results as a search results video, the search results representing a plurality of listings. The search results video may be pre-generated in advance by a search results video generator 202, based on those listings that correspond to frequently-performed searches for frequently-used search terms). The search results video may also be generated on the fly, in response to a search requested by a user. The select request detector 206 may be configured to detect a select request associated with the search results video. A select request may be in the form of a click on the area displaying the search results video, or, for example, in the form of a cursor hovering over the area displaying the search results video. The mapping module 208 may be configured to determine a selected listing from the plurality of listings based on a playing state of the search results video at a time of the select request and the listing rendering module 210 may be configured to present the selected listing on the display device. The mapping module 208 may determine an identification of the selected listing by, e.g., determining a time stamp in the search results video associated with the select request and, based on the determined time stamp, determine an identification of the selected listing. The search results video generator 202 may be configured to generate a mapping between a listing presented in the search results video and a time frame in the search results video during which the listing is being presented. An example method to provide video-based search results can be described with reference to FIG. 3.

Figure 3:
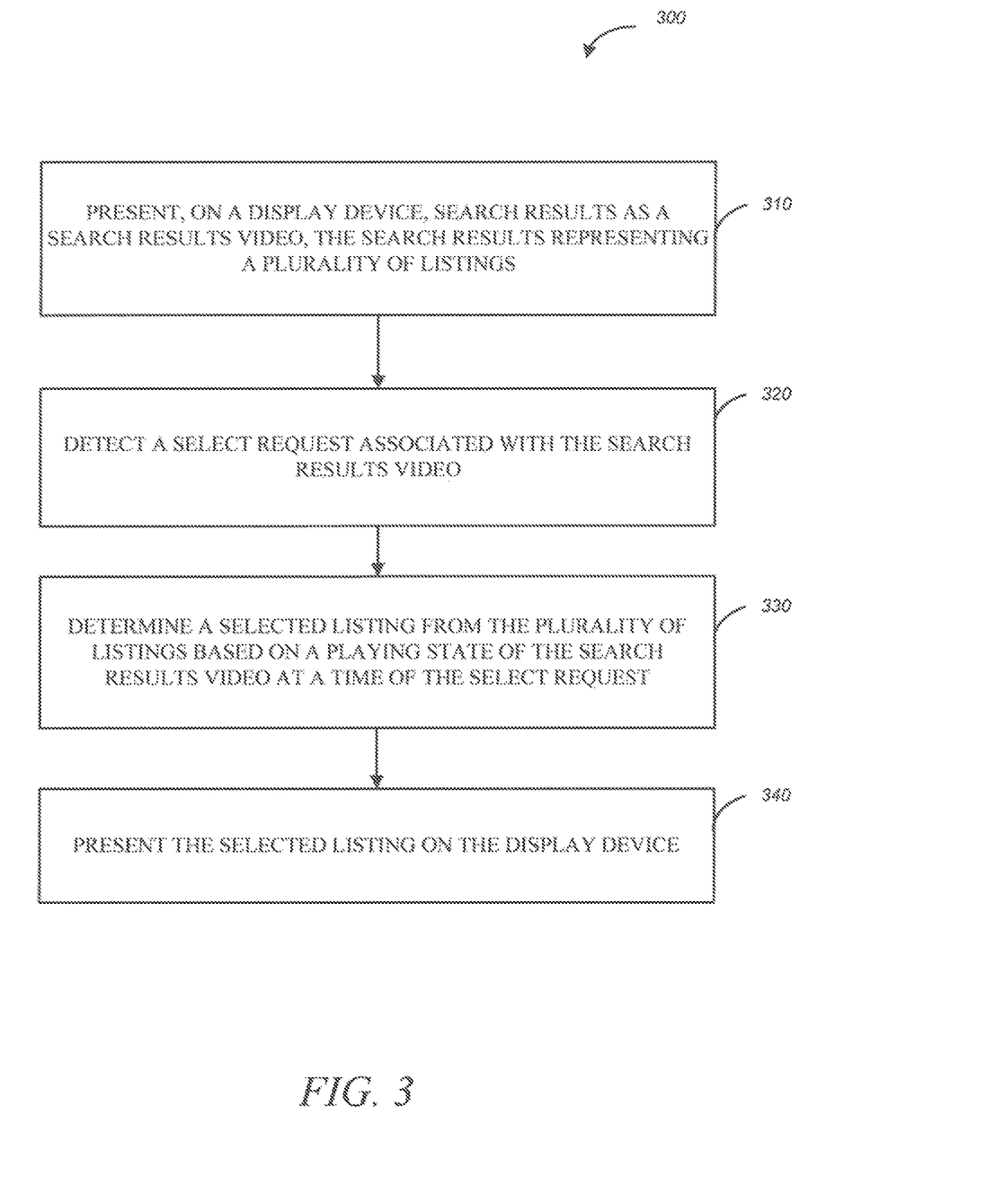
FIG. 3 is a flow chart of a method to provide video-based search results, in accordance with an example embodiment.

FIG. 3 is a flow chart of a method 300 to provide video-based search results, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 118 of FIG. 1 and, specifically, at the system 200 shown in FIG. 2.

As shown in FIG. 3, the method 300 commences at operation 310, when the video player 204 of FIG. 2 present results of a search in the form of a search results video, the search results video displaying details from listings that match certain search criteria. As mentioned above, the search results video may be pre-generated in advance or on the fly, in response to a search requested by a user. At operation 320, the select request detector 206 of FIG. 2 detects a select request associated with the search results video, which may be in the form of a click or a hover action. The mapping module 208 of FIG. 2 determines a selected listing based on a playing state of the search results video at a time of the select request at operation 330. At operation 340, the listing rendering module 210 of FIG. 2 presents the selected listing on the display device.

Figure 4:
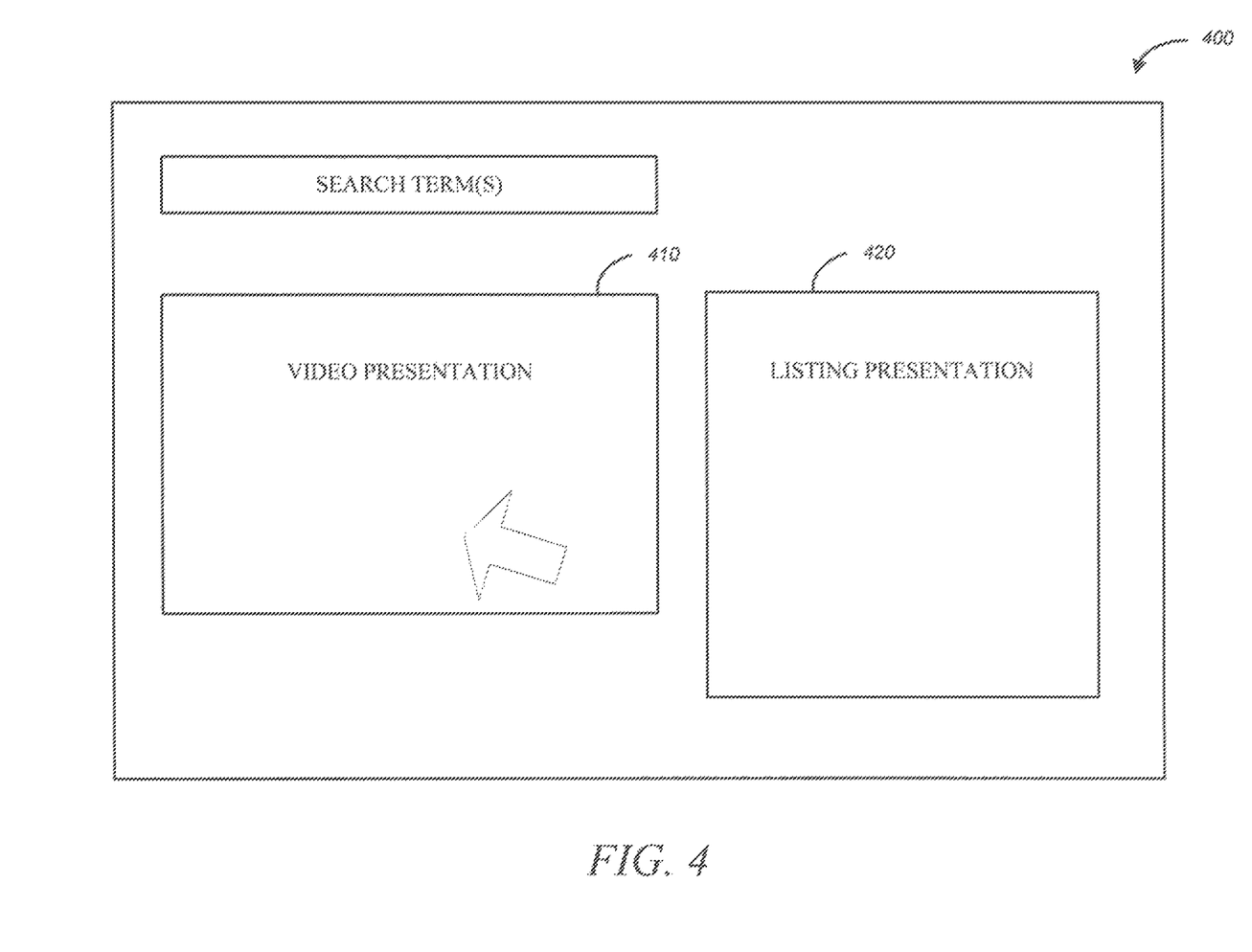
FIG. 4 shows an example user interface to provide video-based search results, in accordance with an example embodiment.

FIG. 4 illustrates a user interface 400 that can present video-based search results as a video (in area 410 on the left-hand side of FIG. 4), as well as the item listing that was presented in the video when a user clicked on or hovered over the area 410 (in area 420 on the right-hand side of FIG. 4).

Example dynamic XML-based template for creating a video version of search results is shown below in Table I below.

TABLE 1

```
            <animator duration="6.0" type="grow" direction="left"/>
            <filter duration="1.5" type="alpha" alphaStart="0.0"
            alphaEnd="1.0"/>
            <filter margin-end="0.0" duration="1.5" type="alpha"
alphaStart="1.0" alphaEnd="0.0"/>
            <filter type="blur"/>
        </text>
        <text left="0.09" height="0.18" bottom="0.01" type="zone"
fontcolor="#000000">$25<animator duration="6.0" type="grow"
direction="left"/>
            <animator duration="1.0" type="slide-in"
            direction="right"/>
            <animator duration="1.0" type="slide-out"
            direction="right"/>
            <animator duration="6.0" type="grow" direction="right"/>
            <filter duration="1.5" type="alpha" alphaStart="0.0"
            alphaEnd="1.0"/>
            <filter margin-end="0.0" duration="1.5" type="alpha"
            alphaStart="1.0"
alphaEnd="0.0"/>
            <filter type="blur" diameter="2.0"/>
        </text>
    </stack>
    <stack duration="6.0">
        <sequence>
            <effect duration="6.0" type="kenburns">
                <image filename="http://i.ebayimg.com/19/!B61-
,pwEWk~$(KGrHqR,!lcEy+jCyFGmBMy5ilKRQ~~-1__12.JPG">
<filter width="0.1" type="frame" color="#FFFFFFFF"/>
                </image>
            </effect>
        </sequence>
```

While the example shown above is an XML file, a template for creating a video version of search results may be provided in other formats acceptable by video-creation tools. It will be noted that the techniques described herein may be practiced utilizing any video-creation software.

Figure 5:
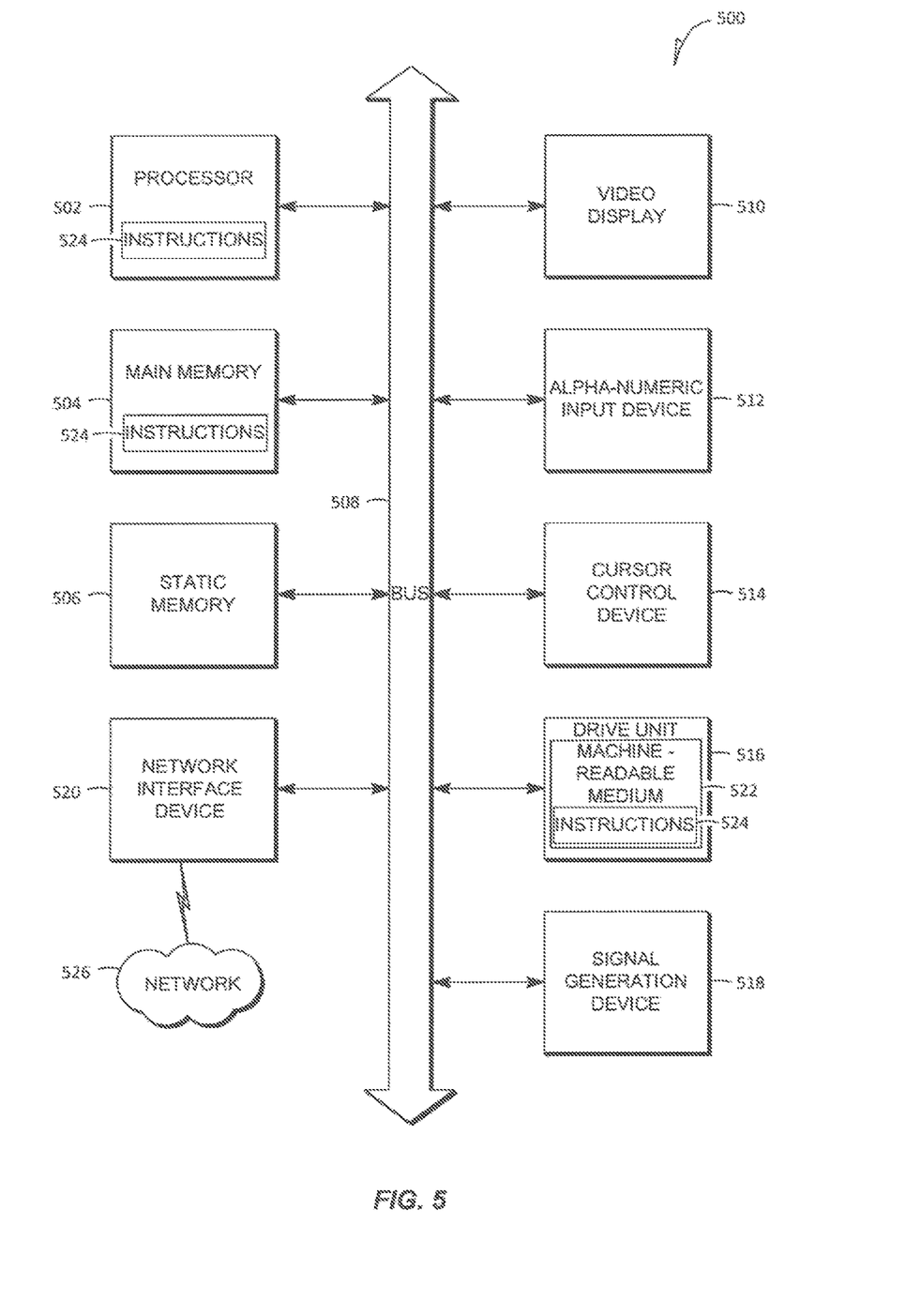
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (CPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to provide video-based search results have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system comprising:
a search results video generator, implemented using at least one processor, to:
   access a plurality of listings identified in response to a search request, and
   directly responsive to accessing the plurality of listings in response to the search request, generate a single search results video from the plurality of listings, the search results video comprising a sequence of content from the plurality of listings;
a video-based search results presentation module, implemented using at least one processor, to provide a user interface with the search results video for presentation on a display device, presentation of the search results video comprising playing the sequence of content from the plurality of listings as a single video;
a select request detector, implemented using at least one processor, to detect a select request during presentation of the search results video;
a mapping module, implemented using at least one processor, to determine a selected listing from the plurality of listings based on the select request; and
a listing rendering module, implemented using at least one processor, to cause presentation of the selected listing adjacent to the search results video on the user interface in response to the select request.

2. The system of claim 1, wherein the search results video generator is to generate a mapping between a listing presented in the search results video and a time frame in the search results video during which the listing is being presented.

3. The system of claim 1, wherein the mapping module is to:
determine a time stamp in the search results video associated with the select request; and
based on the determined time stamp in the search results video, determine an identification of the selected listing.

4. The system of claim 1, wherein the select request is associated with a click on a video display area displaying the search results video.

5. The system of claim 1, wherein the select request is associated with activation of a control button associated with the search results video.

6. The system of claim 1, wherein the select request is associated with a hover action over a video display area displaying the search results video.

7. The system of claim 1, wherein the listing rendering module is to present the selected listing on the display device as an overlay that shows other search-related information.

8. The system of claim 1, wherein the listing rendering module is to present the selected listing on the display device as embedded in a webpage that shows other search-related information.

9. The system of claim 1, wherein the search results video generator is to:
identify frequently used search terms;
identify listings associated with the frequently used search terms; and
generate a pre-prepared search results video based on the listings associated with the frequently used search terms.

10. A method comprising:
accessing a plurality of listings identified in response to a search request;
directly responsive to accessing the plurality of listings in response to the search request, generating, using at least one processor, a single search results video from the plurality of listings, the search results video comprising a sequence of content from the plurality of listings;
providing a user interface with the search results video for presentation on a display device, presentation of the search results video comprising playing the sequence of content from the plurality of listings as a single video;
detecting a select request during presentation of the search results video;
determining a selected listing from the plurality of listings based on the select request; and
causing presentation of the selected listing adjacent to the search results video on the user interface in response to the select request.

11. The method of claim 10, further comprising generating a mapping between a listing presented in the search results video and a time frame in the search results video during which the listing is being presented.

12. The method of claim 10, further comprising:
determining a time stamp in the search results video associated with the select request; and
based on the determined time stamp in the search results video, determining an identification of the selected listing.

13. The method of claim 10, wherein the select request is associated with a click on a video display area displaying the search results video.

14. The method of claim 10, wherein the select request is associated with activation of a control button associated with the search results video.

15. The method of claim 10, wherein the select request is associated with a hover action over a video display area displaying the search results video.

16. The method of claim 10, further comprising presenting the selected listing on the display device as an overlay that shows other search-related information.

17. The method of claim 10, further comprising presenting the selected listing on the display device as embedded in a webpage that shows other search-related information.

18. A machine-readable non-transitory storage medium having instruction data to cause a machine to perform operations comprising:
accessing a plurality of listings identified in response to a search request;
directly responsive to accessing the plurality of listings in response to the search request, generating a single search results video from the plurality of listings, the search results video comprising a sequence of content from the plurality of listings;
providing a user interface with the search results video for presentation on a display device, presentation of the search results video comprising playing the sequence of content from the plurality of listings as a single video;
detecting a select request during presentation of the search results video;
determining a selected listing from the plurality of listings based on the select request; and
causing presentation of the selected listing adjacent to the search results video on the user interface in response to the select request.

* * * * *